Nov. 18, 1958   J. G. AGUILAR ET AL   2,860,468
BAND APPLYING DEVICE AND METHOD

Filed Oct. 26, 1956   7 Sheets-Sheet 1

FIG_1

INVENTORS
JOHN G. AGUILAR
BY   HAROLD B. RICE

ATTORNEYS

Nov. 18, 1958  J. G. AGUILAR ET AL  2,860,468
BAND APPLYING DEVICE AND METHOD

Filed Oct. 26, 1956  7 Sheets-Sheet 2

INVENTORS
JOHN G. AGUILAR
HAROLD B. RICE
BY
Boyken, Mohler & Wood
ATTORNEYS

Nov. 18, 1958    J. G. AGUILAR ET AL    2,860,468
BAND APPLYING DEVICE AND METHOD
Filed Oct. 26, 1956    7 Sheets-Sheet 3

INVENTORS
JOHN G. AGUILAR
BY  HAROLD B. RICE
ATTORNEYS

Nov. 18, 1958 J. G. AGUILAR ET AL 2,860,468
BAND APPLYING DEVICE AND METHOD
Filed Oct. 26, 1956 7 Sheets-Sheet 5

FIG_7

FIG_8

FIG_10

FIG_9

INVENTORS
JOHN G. AGUILAR
HAROLD B. RICE
BY
Boyken, Mohler & Wood
ATTORNEYS Nov. 18, 1958     J. G. AGUILAR ET AL     2,860,468
BAND APPLYING DEVICE AND METHOD Filed Oct. 26, 1956     7 Sheets-Sheet 6

FIG_11

FIG_12

FIG_13

FIG_14

INVENTORS
JOHN G. AGUILAR
BY    HAROLD B. RICE

*Boyken, Mohler & Wood*

ATTORNEYS

Nov. 18, 1958  J. G. AGUILAR ET AL  2,860,468
BAND APPLYING DEVICE AND METHOD
Filed Oct. 26, 1956  7 Sheets-Sheet 7

FIG_15

FIG_16

FIG_17

INVENTORS
JOHN G. AGUILAR
HAROLD B. RICE
BY
Boyken, Mohler & Wood
ATTORNEYS

2,860,468

BAND APPLYING DEVICE AND METHOD

John G. Aguilar, Concord, and Harold B. Rice, Walnut Creek, Calif., assignors to John Burton Machine Corporation, Concord, Calif.

Application October 26, 1956, Serial No. 618,462

18 Claims. (Cl. 53—291)

This invention relates to band applying devices, and more particularly to an apparatus for applying shrinkable, plastic-like, tubular seals to bottle necks.

This application is a continuation-in-part of application Serial No. 369,456, filed July 21, 1953, now Patent No. 2,765,607, issued October 9, 1956; and application Serial No. 546,332, filed November 14, 1955.

In the former of the above noted applications, a method and apparatus were disclosed for applying tubular bands or sleeves to the necks of bottles for sealing the cap or cork of such bottles. In said application, the preferred method of banding was shown, by employing a flattened ribbon of material that is fed onto the bottle necks with a portion of the ribbon being then cut off to form the band. This improved method distinguishes from the previously attempted method of stacking cut bands in magazines and thereafter opening them and applying them to bottles.

Said application discloses an apparatus that includes a pair of feeding rollers for feeding the ribbon of banding material to the bottles. Although this apparatus is effective for the purpose shown, it is sometimes desirable to provide a more positive means for feeding the ribbon to insure that all bands applied to the bottles are of exactly the same length. For example, if the ribbon carries printed matter, it is desirable that the amount of material fed at each feeding interval be the same.

In order to accomplish this more uniform feeding the latter application Serial No. 546,332 discloses a band applying device for feeding the shrinkable ribbon to a bottle neck where the ribbon is fed onto the bottle neck for a selected distance, and then cut to a uniform length. This was illustrated as being accomplished by feeding the ribbon over and around a floating type mandrel by means of a gripping device, sliding the ribbon down over the bottle neck and then cutting the same. Although the apparatus shown in the above patents is very effective for the purpose shown it requires that the bottles be momentarily halted in their path of travel through the machine so that the above operations can be carried out.

It is therefore a main object of this present invention to provide a method and apparatus for applying bands which incorporates improvements over prior methods and apparatus in the above noted respects.

Another object of the invention is the provision of a band applying apparatus that is relatively inexpensive to manufacture and extremely simple both in design and operation.

A further object of this invention is the provision of a bottle banding apparatus that is capable of greater productive capacity by virtue of the fact that said apparatus is inherently capable of much higher operating speed than is possible with prior art devices.

Yet another object of the invention is the provision of banding apparatus by which the ribbon is cut to form a band just prior to the application of the band to a bottle neck.

Another object of this invention is the provision of a new and novel feeding means for feeding the banding material onto a bottle.

Although the present invention will be described in connection with applying bands to bottles having a somewhat elongated neck, it is to be understood that it is equally applicable to the feeding of bands on other articles such as cans, jars etc., and said bands may be formed to any desired length and diameter.

Other objects and advantages will become apparent from the following detailed specification and the drawings.

Figure 1:
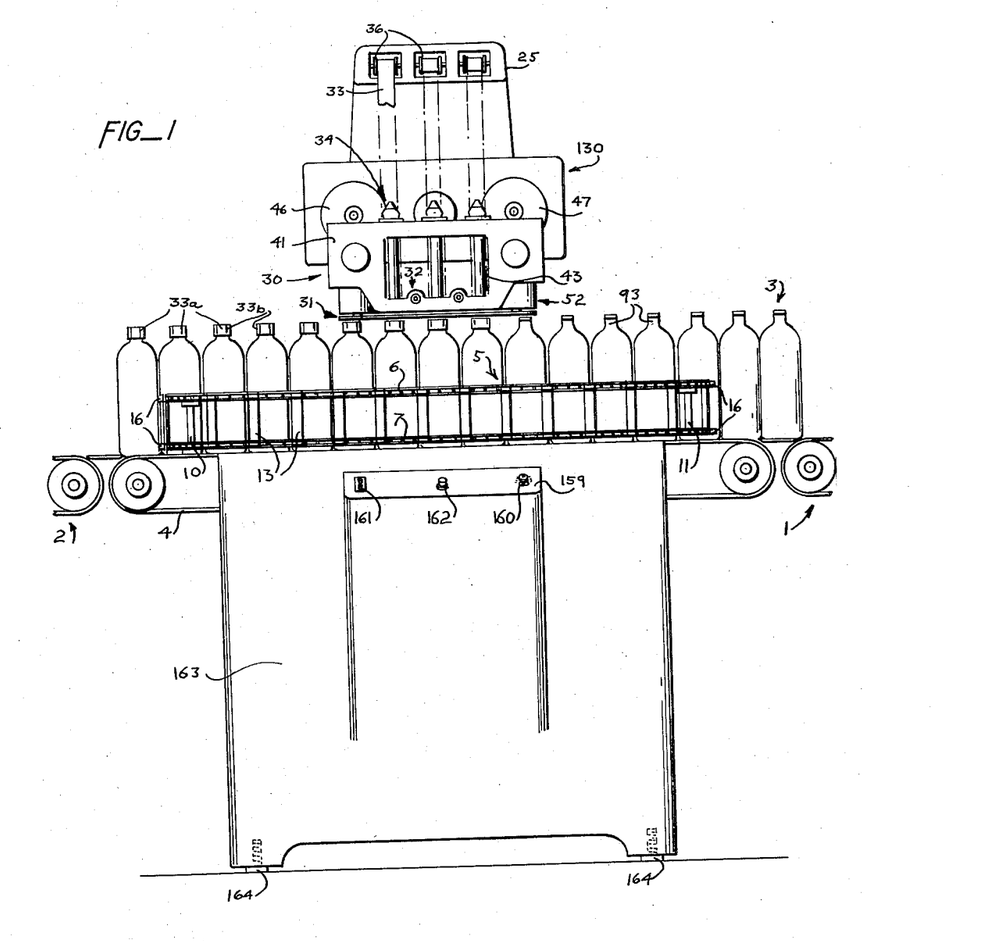
Fig. 1 is a front elevational view of the apparatus of the present invention showing the bottles being fed past the band applying means.

Although the particular manner in which the bottles that are to be banded are fed to the banding apparatus is not critical, this present invention, as seen in Fig. 1, is illustrated in use with a feed conveyor, generally designated 1, and a discharge conveyor generally designated 2.

The bottles, generally designated 3, are adapted to be engaged by a conveyor 4 that is operated with the invention at a speed generally the same as conveyors 1 and 2. The supporting surface of conveyor 4 is adapted to allow the bottles 3 to slide thereon if necessary in order to allow the speed of the bottles to be synchronized with the machine in a manner to be subsequently described.

Conveyors 1, 4 and 3 are in alignment with each other, and may be placed at the same elevation.

Upon being deposited on conveyor 4 from conveyor 1 the bottles 3 are engaged by a flight chain, generally designated 5, that spaces and conducts the bottles past the band applying station.

Figure 11:
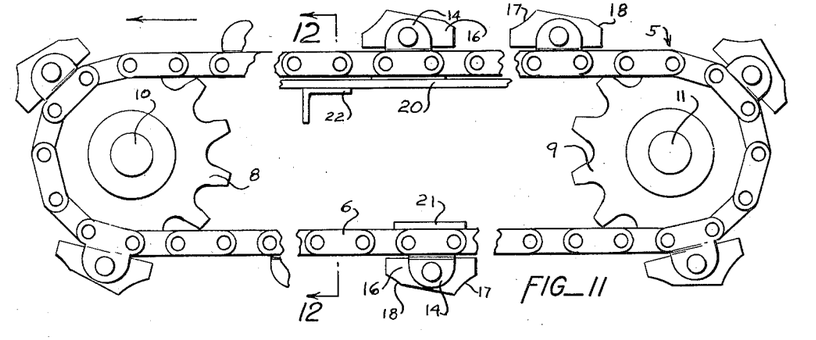
Fig. 11 is a fragmentary, top plan view of the flight chain for spacing and conducting the bottles through the band applying mechanism of the present invention.
Figures 12, 13, 14:
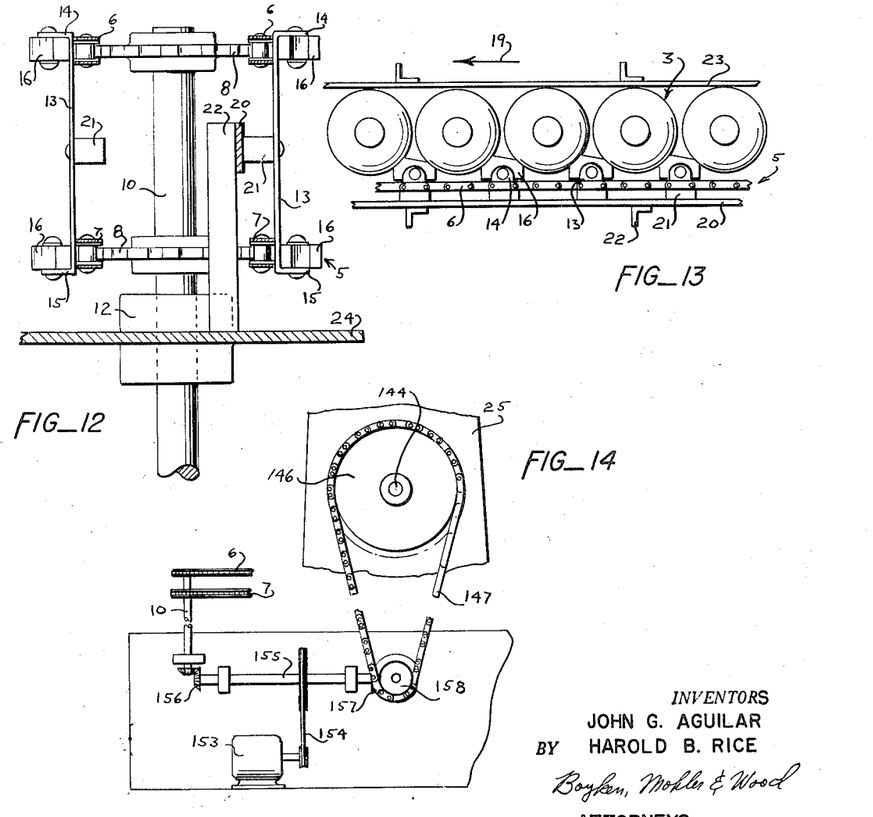
Fig. 12 is a sectional view of the flight chain taken along lines 12—12 of Fig. 11.
Fig. 13 is a semischematic top plan view of the flight chain showing it conducting bottles in uniformly spaced relationship.
Fig. 14 is a fragmentary schematic representation showing the means by which the various components of the machine are synchronously driven.

As best seen in Figs. 11, 12 flight chain 5 comprises a pair of upper and lower horizontally extending roller chains 6, 7 respectively that are driven by means of a pair of driving sprockets 8 and a pair of idler sprockets 9. Sprockets 8 and 9 are mounted on a pair of parallel, vertically disposed shafts 10 and 11 respectively, that may be journalled in bearing elements 12 mounted to the framework 24 of the machine.

As seen in Fig. 12 the roller chains 6, 7 are spaced one above the other thus forming the supporting means for the flights 13 that are spaced at predetermined intervals along the outer circumference of chains 6, 7. The upper and lower ends of flights 13 on chains 6, 7 are bent horizontally outward from said chains to form lugs 14, 15 respectively to which are pivotally secured a pair of correspondingly shaped bottle engaging and positioning pads 16.

Pads 16, preferably, are of a firm yet yieldable composition, such as stiff rubber, and are formed and shaped to provide a leading or pushing bottle engaging surface 17, complementary to the curvature of the bottle which it engages and a trailing surface 18, similarly formed to engage the succeeding bottle.

With reference to Fig. 13 it is seen that the pads 16 pivotally mounted to flights 13 not only urge bottles 3 along a path of travel as indicated by arrow 19, but also uniformly spaced the bottles apart thus presenting the bottles in the proper predetermined spaced relationship to the banding apparatus as will be subsequently described.

In order to prevent lateral deflection of flight chains 6, 7 along the portion of the travel thereof at which the bottles 3 are engaged by pads 16, a backing means is provided in the form of a flat, horizontally elongated, vertically disposed flat bar rail 20 upon which bearing blocks 21, attached to the inner side of flights 13, are adapted to slide. Rail 20 is secured in position, parallel to the inner, or bottle engaging run of chains 6, 7 so that said chains are held against inward lateral deflection and so held in said position as by upstanding angle bar brackets 22 secured to the frame of the machine.

On the opposite side of the bottles 3 from bottle engaging run of roller chains 6, 7 is a railing element 23 (Fig. 13) for holding the bottles 3 in their proper oriented position relative to pads 16.

It will be understood that in place of railing 23 another flight chain system similar to that described above could be utilized. However, no particular advantage is gained therefrom and the arrangement shown has been found to be satisfactory in addition to being simple.

With reference again to Fig. 1 the banding apparatus includes a mandrel supporting head, generally designated 30 that is pivotally mounted on the free ends of a pair of identical parallel arms 46, 47 which, when rotated simultaneously, maintain said head with its bottom horizontal at all times. Head 30 is adapted to contain thereon the banding material cut-off blades 31 and gripping means 32 which will subsequently be described in detail.

As illustrated in Fig. 1 the shrinkable plastic banding material is supplied to head 30 in the form of flattened tubes 33, is then passed over the floating type mandrels, generally designated 34, that are supported by head 30 and is then adapted to be cut by blades 31 to form bands 33a that are applied to the necks of the passing bottles 3. The details of the above noted devices will be described later on.

The banding material 33 is supplied to head 30 from a supply reservoir, not shown, that contains a suitable wetting agent to moisten said material 33 thereby rendering the same supple and pliable.

Supply rollers 36 mounted on an upwardly extending extension 25 of the machine frame may be positioned over head 30 as shown to guide the tubular bands 33.

Figure 2:
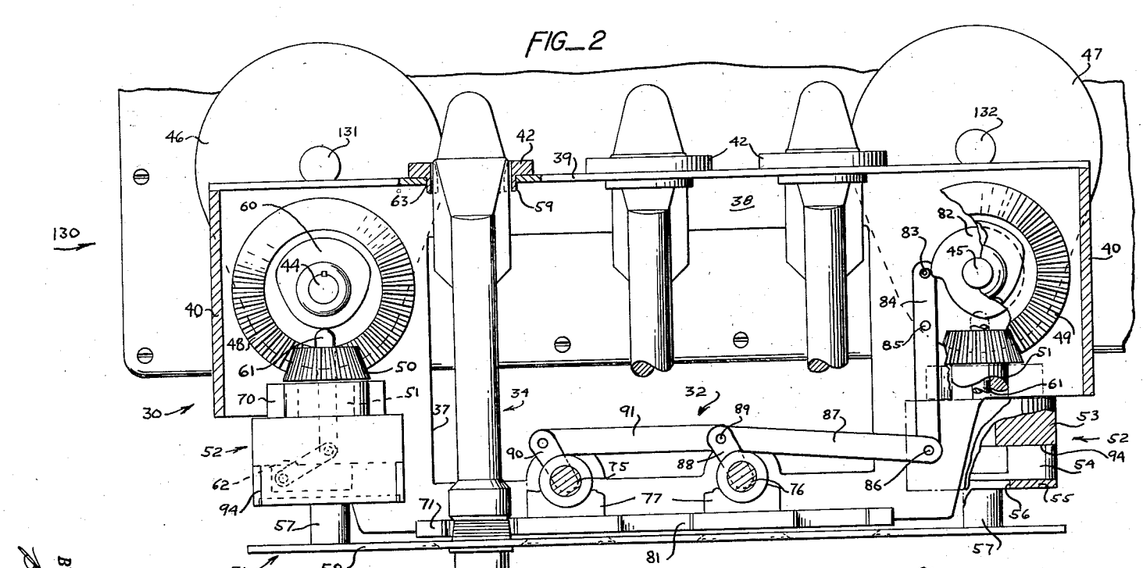
Fig. 2 is an enlarged, partly sectional, partly broken away front elevation of the band applying apparatus of the invention.

As seen in Fig. 2 the structure forming the housing of head 30 is a vertical rear wall 38 with a rectangular opening 37 formed therein to permit access to the head, a top member 39, side plates 40, and a front vertical wall 41 (Fig. 1) also formed with a rectangular opening 43. (See also Fig. 6.)

Mounted on top member 39 are three mandrel receiving bushing elements 42 that have lower reduced diameter portions 59 (Fig. 2) extending through apertures 63 formed in said top member 39. Bushings 42 are equally spaced apart to coincide with the spacing of the bottles 3.

Figure 6:
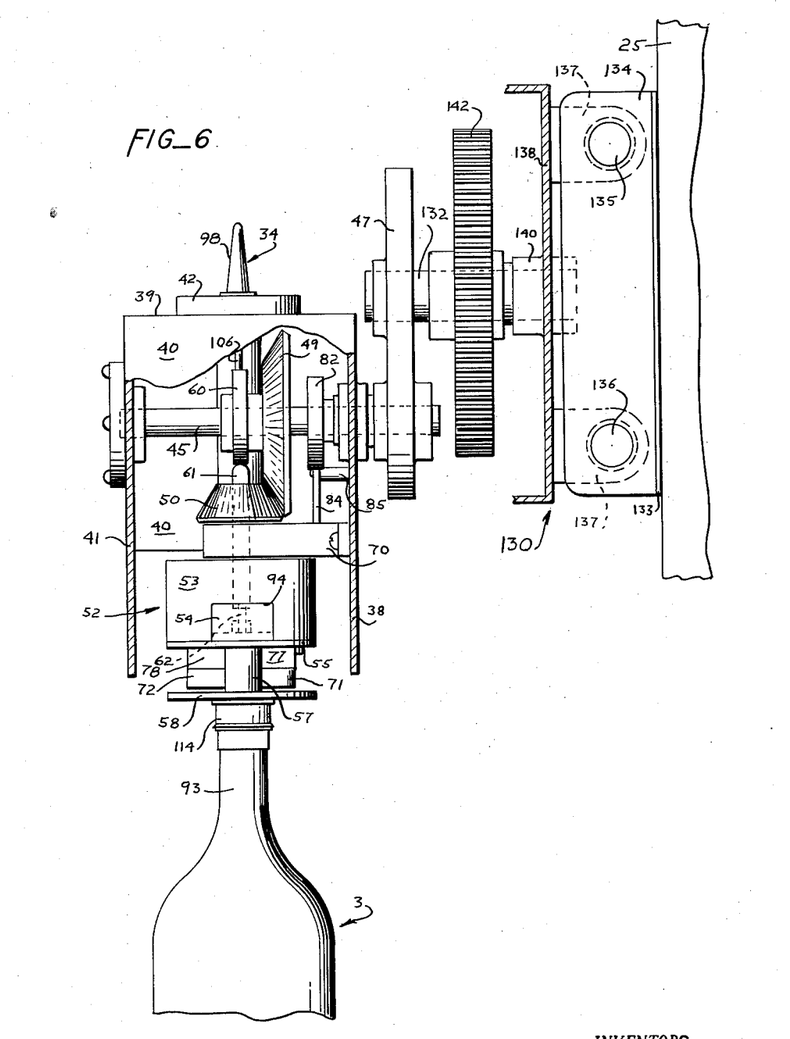
Fig. 6 is a partly sectional end view of the apparatus of Figs. 2 and 4.

Head 30 is carried by a pair of horizontal coplanar, parallel shafts 44, 45 fixedly mounted on arms 46, 47 that extend forwardly through the width of head 30 (Figs. 2, 6).

Thus for each complete revolution of arms 46, 47 the shafts 44, 45 make one rotation with respect to housing 30.

Mounted on each shaft 44, 45, for rotation relative to head 30, are a pair of bevel gears 48, 49 respectively that are provided to furnish a means for actuating the cutoff blade 31 as will now be described.

Because the cooperating structure that is driven by bevel gears 48, 49 is the same for each gear the description will be made with reference to one gear only.

Meshing with gear 48 is a smaller bevel gear 50 of one half the pitch diameter of gear 48 so that it makes two revolutions to each revolution of gear 48. Gear 50 is mounted on and drives a hollow shaft 51 which in turn is rotatably carried by bearing 70 secured to rear wall 38 and drives the eccentric mechanism, generally designated 52 mounted therebelow.

Eccentric mechanism 52 comprises an upper section 53 that is formed with a downwardly opening transverse slot 94 or passageway in which is received a block element 54 that is longitudinally slidable within said slot. To secure block 54 within slot 94 a bottom cover plate 55 is provided. Cover plate 55 may be made integral with the upper section 53 or can be attached as indicated (Fig. 2) to the bottom edge of the cylindrical walls alongside block 54. An enlarged aperture 56 is formed in cover plate 55 to allow a lower shaft 57 attached to block 54 to pass therethrough.

Each shaft 57 is rotatably connected to the end portions of the main support plate 58 of cutoff blade 31.

As long as the axis of rotation of shaft 57 is coaxial with the fixed axis of shaft 51 there is no movement imparted to blade 31. However, when the slidable blocks 54 within mechanism 52 are displaced with respect to the axis of shaft 51, shaft 57 assumes an orbital revolving movement about the axis of rotation of said shaft 51 thereby imparting a circular oscillatory motion to plate 58.

Mounted on shaft 44 for rotation therewith is a radial cam 60. Cam 60 engages a cam follower 61 that slidably passes through gear 50 and hollow shaft 51. The lower end of cam follower 61, is pivotally connected to the upper end of a slantingly disposed link 62 that in turn is pivotally connected at its lower end to the slidable block 54.

It is seen from Fig. 2 that when the cam 60 depresses follower 61 link 62 will assume a more horizontal position, thus moving the slidable block 54 to the left as viewed in the figure. This causes shaft 57 which is connected to block 54 to be moved to an eccentric position relative to the axis of shaft 51, so that as said shaft 51 is rotated shaft 57 will rotate in a circular orbital path about the axis of shaft 51. The identical mechanism that is attached to the right side of plate 58 is of course adapted to be synchronized so that the entire blade 31 is shifted and thus assumes a circular oscillatory motion that is schematically illustrated in Fig. 10 which will be subsequently described.

Figures 7, 8, 9, 10:
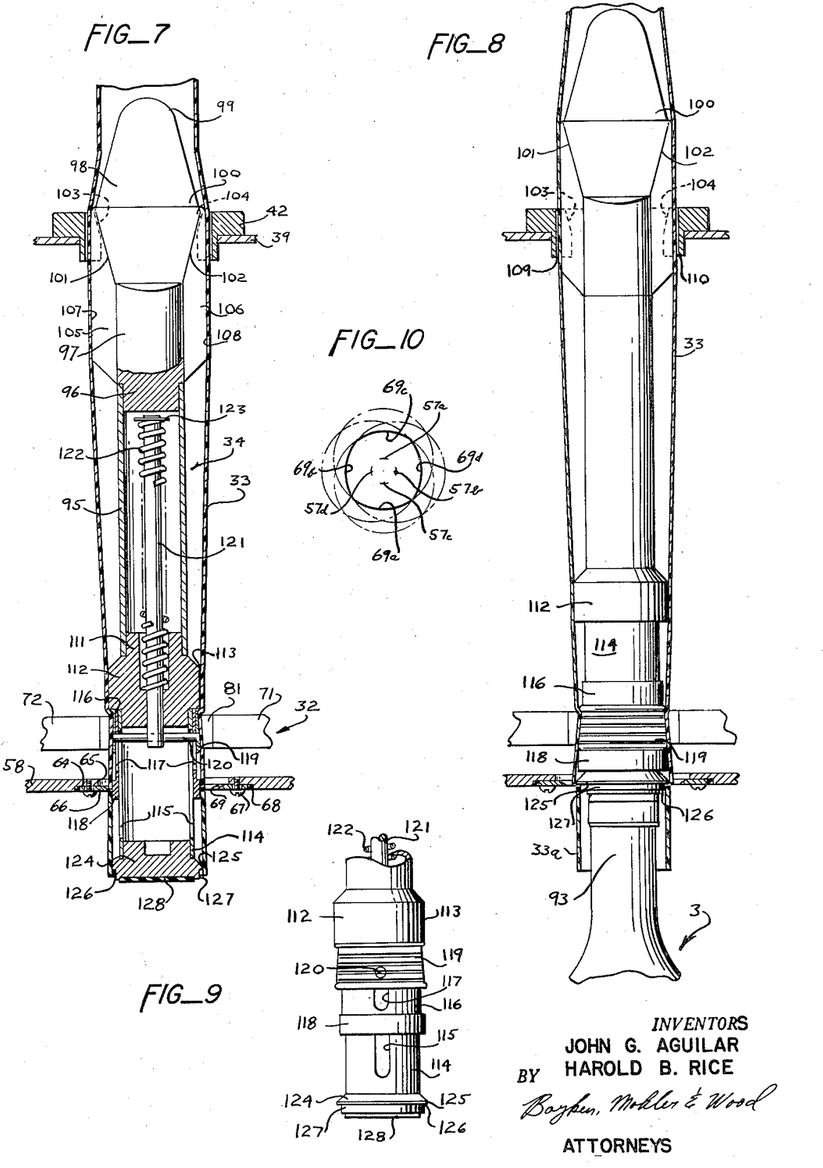
Fig. 7 is a sectional view of the floating type mandrel of the band applying apparatus of Fig. 2 showing the band being cut to length.
Fig. 8 is a front elevation of the mandrel showing the cut length of band being fed onto a bottle neck.
Fig. 9 is a fragmentary view of the mandrel of Fig. 7 showing the lower portion thereof, taken transversely to Fig. 7.
Fig. 10 is a diagrammatic view showing the cutting action of the knives and indicating the locus followed by the center of said cutting blade, with respect to the tubing.

Fig. 7 shows the cutting blade structure of the present invention. Plate 58 is formed with a downwardly opening counterbored recess 64 coaxial with an aperture 65 that is formed therethrough. An annular, removable knife 66 is placed in counterbore 64 and held therein as by screws 67 in such a manner that knife 66 is firmly, yet yieldably held. Surrounding knife 66 is a ring of resilient material 68, such as rubber, that spaces the outer edge of knife 66 from the shoulder of counterbore 64. The beveled and sharpened edge 69 of knife 66 defines a circular opening through which mandrel 34 and banding material 33 are adapted to pass as will be subsequently described.

With reference again to Fig. 10 points 57a, 57b, 57c, 57d denote the locus that the center of shaft 57 follows during its circular oscillatory motion. Arcs 69a, 69b, 69c, 69d thus are the locations of the edge of the knife 66 that correspond to points 57a–d respectively. It is seen by this schematic illustration that when knife 66 is to perform its cutting operations the edge 69 thereof describes a circular path of travel that is smaller in diameter than its normal opening and thereby progressively makes an incision in the tubular material completely around the periphery of the latter.

The gripping device 32 that has been hereinbefore referred to, comprises two similar plate members 71, 72 (Figs 2–3) each formed with three semicircular recesses 73, 74 respectively, that are in spaced, opposed relationship to each other. Recessed plates 71, 72 are supported in horizontal coplanar alignment, with the recesses 73, 74 thereof coaxial with the apertures 65 (Fig. 7) that are formed in knife support plate 58 that is positioned therebelow.

Figure 3:
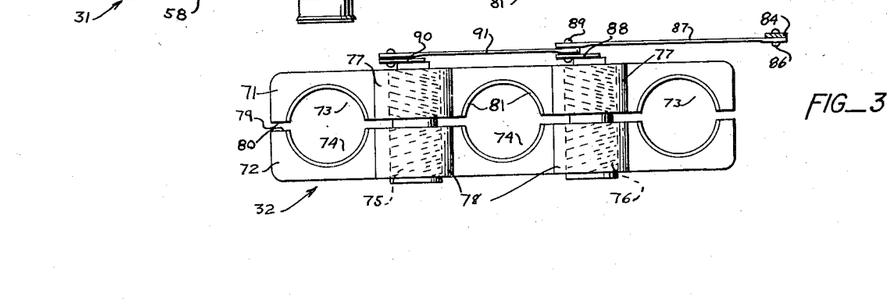
Fig. 3 is a top view of the preferred form of band gripping means.

Plates 71, 72 are supported by a pair of right and left hand screw worms 75, 76 that screwthreadedly engage bosses 77, 78 that are integral with the plates 71, 72 respectively.

As seen in Fig. 3 the screwworms 75, 76 extend transversely of plates 71, 72 and by the rotation of said worms the plates 71, 72 may, because of the oppositely directed threads on said worms, be drawn together or separated as shown. When drawn together plates 71, 72 are adapted to engage each other along their respective opposed faces 79, 80 thus permitting recesses 73, 74 to form a smaller circular aperture the walls of which are adapted to grip the ribbon 33 of banding material as will be subsequently described. The recesses 73, 74 may be provided with a facing 81 (Fig. 3) of relatively rough material, such as rubber, to promote the frictional engagement of recesses 73, 74 with the banding material.

The opening and closing of the gripping plates 71, 72 is controlled by a radial cam 82 that is mounted to shaft 45 for rotation therewith.

Cam 82 acts upon a cam follower element 83 mounted on the upper end of a link 84 that is pivotally mounted intermediate its ends as at 85, to the rear wall 38 of head 30. The lower end of the generally downwardly directed link 84 is pivotally connected as at 86 to a generally horizontal connecting link 87 that in turn is pivotally connected, as at 89, to a short crank arm 88 mounted to worm 76 and extending radially upward therefrom. Extending longitudinally from pivot 89 to be pivotally connected to crank arm 90 of worm 75 is another interconnecting link 91 that permits both worms 75, 76 to be operated in unison.

The sequence of the cutting and gripping motions will be subsequently described in a recapitulation of operations after the description of the remaining structure is complete.

The preferred form of the floating type mandrels 34 is shown in detail in Fig. 7.

Mandrels 34 are provided to form the flattened band of plastic banding material 33 to a tubular shape so the same may be applied to the neck portion 93 of the bottles 3.

The central portion of mandrel 34 is formed from a cylindrical tubular member 95 that is fitted, at its upper end, to the reduced diameter portion 96 of a head 97. Head 97 is formed at its upper end to provide a generally flat sided diamond shaped enlarged portion 98 that serves to initially engage and open the tubular plastic band 33. To provide a smooth engaging surface for the tube opening element 98 the upper end thereof is rounded as at 99. The mandrel 34 is adapted to be supported by the bushing 42 that is fitted to the top member 39 of the head 30.

As seen in Figs. 7, 8 the portion 98 is formed to an increased width at its central section 100. This enables the upwardly and outwardly diverging sides 101, 102 of the lower portion of element 98 to provide a seating surface that is adapted to fit complementarily formed, converging seats 103, 104 respectively, provided in bushing 42.

In order to prevent rotation of mandrel 34 in bushing 42, which would have a tendency to twist the tubular banding material, a pair of longitudinally extending, radially outwardly projecting guide wings 105, 106 are mounted on the head 97 of mandrel 34 in diametrically opposing relationship extending from widened central section 100 of portion 98 downwardly to the place where tubular member 95 engages head 97.

As seen in Figs. 7, 8 the outer edges 107, 108 of wings 105, 106 are adapted to extend radially outward slightly farther than section 100 of portion 98. One reason for this is to permit wings 105, 106 to be received within a pair of radially inwardly opening slots or grooves 109, 110 that are formed in seats 103, 104 of bushing 42 in such a manner to register with said wings 105, 106 (Fig. 8).

It is to be understood, however, that while seats 103, 104 support mandrel 34, and slots or grooves 109, 110 receive wings 105, 106 therein, that the banding material 33 is interposed between said seats, slots, and the cooperating elements of mandrel 34. In its wet condition, the band of plastic material is very pliable and tends to conform to the configuration of the elements that it envelopes. Furthermore, due to the fact that the banding material 33 is supplied in rolls, upon which it is wound in a flattened condition, there are creases formed in the material along its fold lines. It is along these creases that the sides or edges 107, 108 of the wings engage the material, thus further stabilizing the latter against any twisting on the mandrel.

The method of applying the banding material to a bottleneck is as follows:

The banding material is adapted to extend over the full length of the mandrel 34, and it is then cut to its required length at a point spaced upwardly from the bottom of the mandrel.

At this time the uncut portion of the tubular band 33 is now gripped by the actuation of gripping elements 32, said band being held against an element to be subsequently described that is axially slidable with respect to mandrel 34 and mounted thereon. When bottle 3 is placed below mandrel 34, and upon downward movement of head 30 the bottle engages the lower end of the mandrel and causes it to be raised from its seating elements (Fig. 8). This causes the cut band 33a of material 33 to be inserted on the bottleneck 93 so that it extends axially thereof the same amount that mandrel 34 is vertically displaced from its seating elements.

The banding material 33 is held in a manner to be described, against axial movement with respect to the slidable element upon which it is being pressed by gripping means 32. Thus the above described upward movement of mandrel 34 causes the material to once again cover the entire length of the mandrel thus readying the device for the next bottle.

The remaining structure of the mandrel will now be described with reference to Figs. 7, 8 and the general description of the sequence of operations.

Tubular member 95 is joined at its lower end to a reduced diameter portion 111 of an enlarged plug 112 that provides a cylindrical surface 113 upon which the banding material 33 is adapted to slide. The lower portion of enlargement 112 is also reduced in diameter, to receive the upper end of a cylindrical fixed shell member 114 which is provided with a pair of diametrally opposed longitudinally extending slots 115 formed therethrough (Figs. 7, 9).

Slidably mounted on the exterior surface of shell 114 is another thin walled shorter cylindrical shell or slide 116 with a pair of longitudinally extending slots 117 also formed therethrough. The lower marginal end of shell 116 is upset to provide an enlarged diameter annular projection 118 which acts as a cutting anvil for knife blade 66. Fig. 7 shows the banding material being cut by knife 66, and the annular enlargement 118 of shell 116 acting as the anvil therefor.

Slidably mounted on the exterior surface of shell 116 is an annularly grooved ring-like element or slide 119 which is connected to a transverse pin 120. Pin 120 in turn is fastened to the lower end of a vertical rod 121 that slidably passes through enlargement 112 and is adapted to be yieldably urged to its upper position by means of an encircling helical compression spring 122 acting between a washer 123 fixed to the upper end of rod 121 and the enlargement 112.

Fitted to the lower end of the cylindrical shell 114 is a base element 124 that is adapted to provide the surface upon which the top of the capped bottle neck 93 acts as hereinbefore described. Base 124 is formed with an annular enlarged diameter ridge 125, and immediately therebelow is slightly reduced in diameter to form an annular shoulder 126 and a cylindrical surface 127.

The bottom of base 124 is centrally recessed to receive a rubber insert 128 placed therein to act as a cushion and to enhance friction between the base and the bottle cap.

A detailed description of the operation of the mandrel 34 will be made along with the recapitulation of the sequence of operation for the invention.

As seen in Figs. 1 and 6 head 30 is mounted on a pair of rotating parallel arms 46, 47, which are carried and rotated by a pair of rotating shafts 131, 132 respectively, extending from within a reciprocating speed compensating device, generally designated 130 (Fig. 2).

Due to the fact that the horizontal component of the velocity of head 30 varies with the angular displacement of parallel arms 46, 47, reaching a maximum when arms 46, 47 are vertical a means must be provided to compensate for this variance in horizontal velocity so that the mandrels 34 are always centered above the bottle necks 93 during the entire time they are in engagement therewith.

Figure 4:
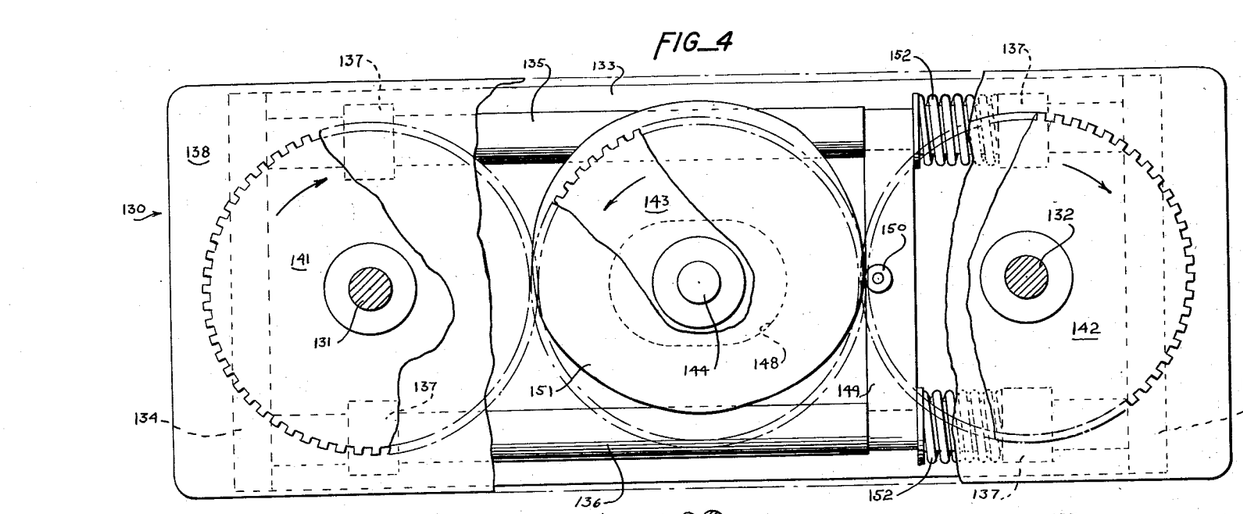
Fig. 4 is a partly sectional, partly broken away front elevation of the driving means for the apparatus of Fig. 2.
Figure 5:
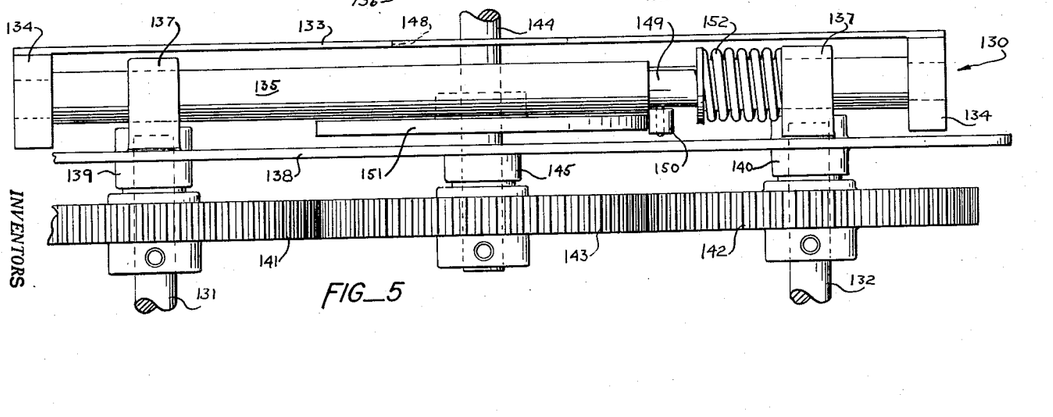
Fig. 5 is a top plan view of Fig. 4.

This is accomplished by means of the speed compensating device 130 that is illustrated in detail in Figs. 4, 5.

Speed compensator 130 comprises a substantially flat plate member 133 which is mounted to the frame of the machine in a vertical plane and extending longitudinally of the path of travel of bottles 3. The ends of plate 133 are provided with a pair of outwardly directed bosses 134 which are adapted to support a pair of elongated, longitudinally extending upper and lower parallel rods 135, 136 respectively. Slidably mounted on rods 135, 136 as by bosses 137 is another plate element 138, parallel to plate 133 that is provided to furnish a supporting means for shafts 131, 132 rotatably mounted thereon as by bearings 139, 140 respectively.

Mounted on shafts 131, 132, outwardly of plate 133, are a pair of similar spur gears 141, 142 respectively which are adapted to be driven by a centrally placed driving gear 143 that meshes with both gears 141 and 142. Gear 143 is driven by shaft 144, that is also journalled to plate 138 as by bearing 145, and extends inwardly through the fixed plate 133.

A horizontally elongated aperture 148 is formed in plate 133 to allow shaft 144 to pass therethrough, and to provide clearance during the horizontal reciprocation of plate 138.

Shaft 144 is driven by a chain sprocket 146 and roller chain 147 (Fig. 14) that are paced at the back of the machine in any conventional manner.

Extending vertically between rods 135, 136 and connected thereto is a rigid bracket element 149 on which is rotatably supported a follower 150 at the central portion of said bracket. Follower 150 is acted upon by a uniformly accelerating radial cam 151 mounted on shaft 144, for rotation therewith, in the space between plate 138 and rods 135, 136.

Since the rods 135, 136 that bracket 149 and follower 150 are mounted on are fixed with respect to the machine, the rotation of cam 151 will cause a reciprocating motion to be imparted to plate 138 and all associated elements connected thereto. Since the cam 151 acts to move the plate 138 to the left as shown in Figs. 4, 5 a pair of helical compression springs 152 are provided to return the plate 138 to the right and also maintain engagement of cam 151 with follower 150.

Since the head 30, hereinbefore referred to, is connected to the compensating device 130 by means of shafts 44, 45, parallel arms 46, 47 and shafts 131, 132 it is seen that head 30 also is reciprocated longitudinally. The shape of cam 151 is predetermined so that the horizontal component of the velocity of head 30 is constant during the time the mandrels are in engagement with the bottles.

To clarify the action of compensating device 130 the angular displacement of parallel arms 46, 47 will be described with reference to clock positions.

As seen in Figs. 1, 2 the arms 46, 47 are at 6 o'clock, when in this position the tangential velocity of said arms, and thus head 30, is entirely in a forward horizontal direction. However, when arms 46, 47 are descending from 3 o'clock to 6 o'clock the horizontal component of velocity is increasing from a minimum of zero at 3 o'clock to the maximum or tangential velocity at 6 o'clock. Since the bottles are being moved at a uniform constant velocity past head 30, and since the mandrels are adapted to initially engage said bottles at about the 4 o'clock position of the arms, and not leave engagement therewith until about 8 o'clock, it is required that the horizontal velocity of head 30 be the same as the velocity of bottles 3 during the period of their engagement. This is accomplished by means of cam 151 that acts to move compensator 130 as previously described.

To clarify the operation of this invention, and to correlate the movements of the various component parts said operation will be described in the same sequence as the banding takes place. In this particular embodiment of the invention, a machine is shown that is adapted to band a group of three bottles at one time. It is obvious that this could be varied by merely providing the same machine with more or less mandrels 34.

Before starting the machine the mandrels 34 are supplied with the wet plastic banding material 33 so as to cover their entire length down to a point just below shoulder 126 (Figs. 7, 8). The bottles 3 are then fed onto conveyor 4 as by infeed conveyor 1 (Fig. 1) and the machine is started. The pads 16 of of flight chain 5 engage and properly space the bottles 3 while conducting said bottles through the machine at the proper speed. As the group of three bottles 3 reach a point along their path of travel substantially below head 30 the downwardly descending and forwardly moving head 30 allows rubber insert 128 of mandrels 34 to engage the closures of bottles 3. Further descent of head 30 causes mandrels 34 to be lifted off of their seats 103, 104 on bushings 42 and to be supported on said bottles. The gripping device 32 having previously closed holds the banding material against the sliding ring 119 thus feeding the previously cut sleeve or band 33a onto the bottle neck.

When the parallel arms 46, 47 reach their lowermost position the quick falling cam 82 allows the recessed plates 71, 72 to be rapidly opened in order to prevent the banding material 33 that now has been fed once again to the bottom of mandrel 34 from being carried back up said mandrel due to the progressive reseating of the mandrels as the head 30 ascends from bottles 3.

When parallel arms 46, 47 have reached approximately the 8 o'clock position cam 82 again closes the recessed plates upon ring 119 and the knife actuating cam 60 depresses cam follower 61, actuating the eccentric device 52 that causes knives 66 to commence their oscillatory cutting motion to progressively make an incision about the periphery of material 33, against anvil 118. This cutting process takes place during the time arms 46, 47 move from 9 o'clock to substantially 3 o'clock when plate 58 and shafts 57 are once again returned to their concentric position to cease cutting. At this time rod 121 within mandrel 34 is at its upper position as shown in Fig. 7 and the cut band 33a is carried by anvil 118 and the ridge 125 formed on the lower plug 124. Once again a group of bottles 3 are placed below the now descending head 30, gripping elements 32 are closed on ring 119 and mandrel 34 is engaged by bottleneck 93. The raising of mandrel 34 causes ring 119 to slide downwardly thereon until the bottom marginal portion of ring 119 engages the annular anvil of sleeve 116. Continued raising of mandrel 34 now causes sleeve 116 and ring 119 to be further lowered thereon thus allowing the lower marginal cut edge of the uncut material 33 to push against the upper marginal cut edge of the band 33a thereby placing said band over the neck 93 of the bottle.

Were slots 117 not provided in sleeve 116 the cut band 33a could not be completely placed around bottleneck 93 because the anvil 118 of sleeve 116 would contact ridge 125 and thereby prevent further downward travel of ring 119.

Mandrel 34 is constructed so that between surface 113 of plug 112 and the outer surface of ridge 125 there is no portion of ring 119 or anvil 118 that is of a greater diameter. This is done so that when the gripping elements 32 release ring 119 thus allowing said ring and sleeve 116 to be rapidly returned to the position of Fig. 7 by the urgency of spring 122 there will be a space between said ring 119 and anvil thereby preventing the same from engaging the inner surface of material 33 and carrying said material back up the mandrel.

The driving means for the machine of the present invention is schematically illustrated in the fragmentary view of Fig. 14.

A, preferably, variable speed driving source such as motor 153 is connected by a belt 154 to a jack shaft 155. Shaft 155 is provided with bevel gears 156, 157 which are adapted to drive the flight chain drive shaft 10 and a chain sprocket 158 respectively. Sprocket 158 drives chain 147 which then supplies power to the hereinbefore described apparatus.

A control panel 159 is provided on the front of the machine (Fig. 1). Panel 159 may be equipped with a motor speed regulator 160, a start and stop switch 161, and a warm up or reset button 162.

In order to enhance the appearance of the machine the banding material storage tanks and power train may be enclosed by a sheet metal shroud 163.

Adjustable height leg elements 164 are provided to position the machine in a level plane and also serve to correctly align conveyor 4 with respect to the infeed and discharge conveyors 1, 2.

It may also be deemed advisable to provide a guard over the exposed portion of flight chain 5 to prevent the machine operator from possibly becoming entangled therewith.

Since this present invention is capable of banding bottles at a high rate of speed it may have a tendency under certain conditions to get ahead of the rest of the bottling operations of the plant in which it is installed. For this reason the variable speed motor is provided. However, it is required that the bottles be banded in groups of three for maximum efficiency in this particular case, therefore a switch may be interposed in the infeed conveyor line to start the machine operating only when there are a sufficient number of bottles awaiting bands.

Figure 15:
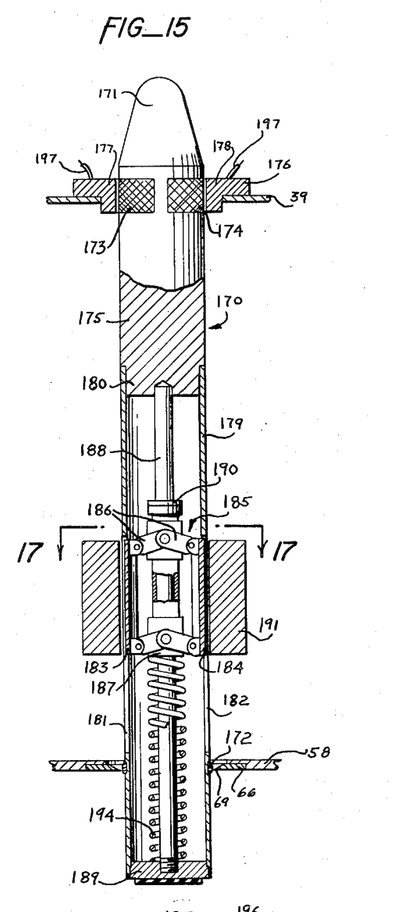
Fig. 15 is a sectional, front elevation of a modified form of band feeding and applying means.
Figure 16:
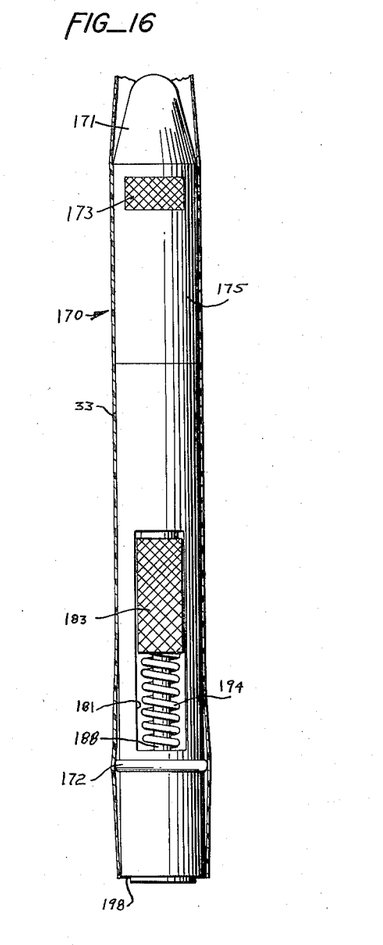
Fig. 16 is a side view of the device of Fig. 15.
Figure 17:
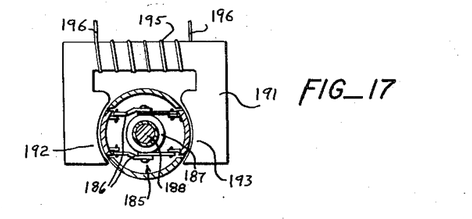
Fig. 17 is a top sectional view taken along lines 17—17 of Fig. 15.

Figs. 15–17 illustrate a modified form of mandrel that is adapted to be carried and supported by the previously described head 30 in a manner that eliminates the necessity of bushings 42, gripping means 32 and various linkages associated therewith.

As shown in Fig. 16, the modified form of the mandrel, generally designated 170, is a smooth, vertically elongated cylinder of nonmagnetic material with a rounded conical cap 171.

A cutting anvil 172 is provided in the form of an annular encircling ridge formed on the lower portion of mandrel 170, that is spaced upwardly from the bottom of the mandrel the same distance as the axial length that the cut band 33a is to be.

This modified mandrel 170 is adapted to be electromagnetically supported. Spaced just below the conical cap 171 are a pair of diametrically opposite arcuately formed magnetizable metallic inserts 173, 174 that are recessed flush into the solid upper portion 175 (Fig. 15) of mandrel 170.

Spaced slightly from mandrel 170 on opposite sides thereof, so as to register with inserts 173, 174 are the poles of an energizable electromagnet 176 that is supported on member 39 of head 30. When a magnetic field is established between the opposed poles 177, 178 of magnet 176 said field attracts the magnetizable inserts 173, 174 thereby permitting mandrel 170 to be thus supported.

As seen in Fig. 15, the lower portion of mandrel 170 is formed of a cylindrical shell 179 connected to upper portion 175 at a reduced diameter section 180 thereof.

Shell 179 is provided with a pair of opposed, longitudinal openings 181, 182 through which a pair of rectangular, arcuately formed band engaging elements 183, 184 are adapted to be yieldably drawn (Fig. 16).

The band engaging elements 183, 184 are pivotally supported by a parallel arm type linkage generally designated 185, consisting of four pairs of arms 186, pivotally mounted to the upper and lower portions of each element 183, 184, and also pivotally connected to an elongated slidable sleeve 187 that is carried by a stationary, upstanding rod 188 extending the length of cylindrical shell 179 and fastened to a bottom base member 189 of mandrel 170 and the upper half 175 at the reduced diameter portion 180.

As stated, bushing 187 is slidable on rod 188, as seen in Fig. 15 the bushing 187 is at its uppermost position, being prevented from further upward travel on rod 188 by any suitable means such as collars 190 fixedly secured to rod 188.

A helical compression spring 194 encircles the portion of rod 188 that is below bushing 187 and is adapted to yieldably urge bushing 187 and the attached elements 183, 184 to the uppermost position.

The band gripping elements 183, 184 are adapted to be magnetically actuated by means of a stationary electromagnet 191 that is mounted to head 30 to perform an analogous function to the previously described gripping device 32.

When electro-magnet 191 is energized a magnetic field is set up between the opposed poles 192, 193 thereof (Fig. 17). Pole 192 is positioned with respect to the mandrel 170 so that when energized it attracts the rectangular magnetizable element 183 to it, and pole 193 similarly attracts element 184. Since when attracted to the magnet 191 the elements 183, 184 are drawn outward from within mandrel 170 the parallel arms 186 urge bushing 187 downward a small distance against the urgency of spring 194.

Electro-magnet 191 is adapted to be energized by a coil 195 with leads 196 that are connected to a regulated source of electric current. Likewise magnet 176 is similarly energized by a coil (not shown) and leads 197.

The operation of the modified mandrel 170 is as follows:

The tubular banding material is slipped around mandrel 170 to completely cover the same down to the lower edge 198 thereof (Fig. 16). Then while the mandrel 170 is being held in its correct position in head 30 magnet 176 is energized to thus support the mandrel as previously described.

At this time the band engaging elements 183, 184 are in the position shown in Fig. 15.

The machine may now be started and the band cutting operation performed as desired for the preferred form of the invention. When cut from the rest of the material 33, the band 33a will not drop off of mandrel 170 because it has a natural tendency to return to its flattened shape, this enables the band 33a to be carried by mandrel 170 by no other forces or means than the friction and liquid surface tension between band 33a and the surface of the mandrel.

As head 30 is descending and the base 189 of the mandrel 170 first engages the top of the bottleneck 93 the current to electro-magnet 176 is automatically shut off as the mandrel 170 is now being supported on the bottle, and simultaneously the lower electro-magnet 191 is now energized. Energizing magnet 191 causes the band engaging elements 183, 184 to grip the inner surface of band 33 and to hold the same securely against the surfaces of the arcuately formed concavely recessed poles 192, 193.

As head 30 now descends further the mandrel 170 is raised with respect to said head, thus allowing the uncut band 33 to push against the cut band 33a and place the latter over the bottleneck 93. Magnet 91 is energized during the downward travel of head 30 and thereby causes elements 183, 184 to remain in magnetic engagement therewith by causing bushing 187 to slide downward on rod 188 against the urgency of spring 194.

At the bottom of the stroke, when band 33a has been put on the bottleneck and the remaining uncut material 33 has been drawn over the mandrel to once again be coterminous therewith, the current to magnet 191 is automatically shut off thus allowing spring 194 to rapidly release elements 183, 184 from engagement with band 33 and simultaneously return bushing 187 and said elements to their upper position.

When head 30 is starting to ascend, the mandrel 170 is now ready to be lifted off of the bottle. Electro-magnet 176 is once again automatically energized and upon further ascension of head 30 lifts mandrel 170 from the bottle and magnetically supports the same.

In order to prevent wobbling during the cutting operation it is advisable that the lower electro-magnet 191 be energized thus lending a support to the lower portion of the mandrel. If this is done the magnet 191 will then be energized for substantially 270 degrees of rotation of arms 46, 47, i. e., from 9 o'clock to 6 o'clock position of said arms.

The devices for controlling the current to the two magnets are not shown but may be of conventional structure such as micro-switches actuated by cams that revolve with shafts 44, 45.

In order to promote frictional engagement between banding material 33 and elements 183, 184 the surface of the latter is roughened or knurled.

An important feature of this invention resides in the fact that the cutting operation is performed during the time the head 30 is out of working relationship with the bottle necks. This results in a considerable saving in time for each cycle.

In this same connection it should be noted that there is no tendency for the cut band to fall downwardly by gravity before the actual feeding operation commences. This is due to the fact that the banding material 33, being previously in a flattened condition is not perfectly cylindrical but, due to its inherent resiliency, tends to remain flat and therefore retains diametrally opposite outwardly projecting ridges or creases 33b (Fig. 1). Thus due to its resiliency the cut band 33a tends to hug the mandrel and especially anvil 18 of sleeve 116 and ridge 125.

The above noted partially flattened shape of the cut band also insures that the band is positively fed by the uncut material and does not telescope relative thereto, an undesirable result that might occur if the material were perfectly cylindrical because the material is extremely thin.

It should also be noted that, once the upper cut end of the band 33a is urged downwardly beyond the annular ridge 125 of the mandrel there is no tendency for the cut band to remain with the mandrel because the ridge 125 has a relatively large maximum diameter (Fig. 8). On the contrary, the band tends to adhere to the bottle neck (Fig. 1) and does not tend to fall downwardly therealong by gravity because the resiliency of the previously flattened band makes it hug the bottle neck.

It should further be noted that the use of a double slide arrangement (sleeves 116 and 119) permits the cutting operation to be performed at a convenient point along the length of the mandrel where the mandrel may be held relatively rigid during the cutting operation. In this connection it should be noted that the mandrel is firmly held against deflection by the gripping device 32 while the cutting operation is performed.

It is also pertinent to note that, the mandrel is arranged relative to the head 30 so that feeding of the band is permitted as soon as the gripping device initiates the feeding movement. Although this provision can be effected through other means contemplated by the present invention, in the preferred form shown in Figs. 7-9 relative movement between the mandrel 34 and head 30 causes mandrel 34 to be freed from bushing 42.

Although resilient ring 68 between knife 66 and plate 58 permits complete cutting of the band it is possible to obtain sufficient yieldability by omitting ring 68 and making the connection between knife 66 and plate 58 rigid, provided the facing 81 of the gripping elements is of a sufficiently yieldable material to permit yielding of the mandrel as a result of the force impressed thereon by the knife 66.

One important advantage of the invention is that it permits the joining up of successive rolls of tubular material without stopping the operation. In other words, it is merely necessary to telescope the end of one roll within the free end of the next roll to effect a continuous operation. One container will thereby have a band of double thickness but this is not objectionable.

Perhaps the most important advantage of the present invention resides in the fact that the movement of bottles 3 may be continuous since they need not be stopped to permit the bands to be applied. This feature is achieved in part by the speed compensating device 130 that permits the head 30 to travel at a uniform speed in a horizontal direction while the band applying operation is being performed.

The herein very detailed description is merely representative of the invention in its preferred form. As illustrated by the modified mandrel many modifications can be resorted to. Another modification also contemplated by this invention is a change in the speed ratio between the bevel gears 48 and 50 so that for one revolution of the parallel arms four or more revolutions may be imparted to mechanism 52 thus allowing the cut-off knives 66 to make two or more orbital revolutions about mandrel 34 thus insuring positive cutting. Likewise many other modifications can be resorted to without departing from the spirit of the invention and the scope of the following claims.

We claim:

1. The method of longitudinally feeding an elongated tubular member relative to an obstruction within said member preventing internal access to said member from one end thereof, comprising the steps of: gripping a portion of the wall of said member between inner and outer surfaces on opposite sides of said sidewalls by exerting opposed outwardly and inwardly directed forces on said surfaces as one unit, and relatively moving said surfaces and said obstruction as another unit longitudinally of said member.

2. The method of longitudinally feeding an elongated tubular member relative to an obstruction within said member preventing internal access to said member from one end thereof, comprising the steps of: gripping a portion of the wall of said member between inner and outer surfaces on opposite sides of said sidewalls by exerting opposed outwardly and inwardly directed forces on said surfaces as one unit, and relatively moving said surfaces and said obstruction as another unit longitudinally of said member, releasing said forces and returning said surfaces to the original position thereof and thereafter gripping another portion of said member in like manner and repeating said movement.

3. Means for longitudinally feeding an elongated tubular member comprising: a mandrel adapted to be received within said member, an inner gripping element carried by said mandrel and supported for movement longitudinally of said member, an outer gripping element, means supporting said outer gripping element for movement longitudinally of said mandrel, means for relatively moving said inner and outer elements toward each other for gripping the adjacent wall of said member therebetween, and means for relatively moving said mandrel and said elements longitudinally of said member while said wall is so gripped.

4. Means for longitudinally feeding an elongated tubular member comprising: a mandrel adapted to be received within said member, an inner gripping element carried by said mandrel and supported for movement longitudinally of said member, an outer gripping element, means supporting said outer gripping element for movement longitudinally of said mandrel, means for relatively moving said inner and outer elements toward each other for gripping the adjacent wall of said member therebetween, and means for relatively moving said mandrel and said elements longitudinally of said member while said wall is so gripped, means for releasing said elements from gripping relationship with said wall and means for returning said elements to their original positions relative to said mandrel.

5. In a banding machine for applying a band of flexible tubular material around a bottle neck or the like comprising: an elongated mandrel adapted to be received within a length of such tubular material adjacent one end thereof, means supporting said mandrel in alignment with said neck, means for circumferentially cutting said length at a point spaced from said end a distance equal to the length of such band whereby severing a band from said length, and means for feeding said length toward said neck whereby said band is fed onto said neck by said length.

6. In a banding machine for applying a band of flexible tubular material around a bottle neck or the like comprising: an elongated mandrel adapted to be received within a length of such tubular material adjacent one end thereof, means supporting said mandrel in alignment with said neck, means for circumferentially cutting said length at a point spaced from said end a distance equal to the length of such band whereby severing a band from said length, and means for feeding said length toward said neck whereby said band is fed onto said neck by said length, said cutting means including a member provided with a circular cutting edge in surrounding relation to said mandrel, and means for imparting an orbital movement to said plate relative to said mandrel whereby said cutting edge progressively engages the periphery of said band.

7. In a banding machine for applying a band of flexible tubular material around a bottle neck or the like comprising: an elongated mandrel adapted to be received within a length of such tubular material adjacent one end thereof, means supporting said mandrel in alignment with said neck, means for circumferentially cutting said length at a point spaced from said end a distance equal to the length of such band whereby severing a band from said length, and means for feeding said length toward said neck whereby said band is fed onto said neck by said length, said cutting means including a member provided with a circular cutting edge in surrounding relation to said mandrel, and means for imparting an orbital movement to said plate relative to said mandrel whereby said cutting edge progressively engages the periphery of said band, said feeding means including an inner gripping element carried by said mandrel for longitudinal movement relative thereto and an outer gripping element cooperating with said inner element for gripping the sidewall of said member therebetween, and means for translating said elements in unison while said side wall is so gripped.

8. In a banding machine for applying a band of flexible tubular material to a bottle neck or the like comprising: an elongated mandrel adapted to be received with a length of tubular material adjacent one end thereof, a first slide supported on said mandrel for longitudinal movement relative thereto, a second similarly supported slide, a gripping element external to said length cooperating with said first slide for gripping the sidewall of said length therebetween, means for translating said first slide and said gripping element in unison relative to said mandrel for feeding said length longitudinally of said mandrel, cutting means cooperating with said second slide for circumferentially cutting said length to sever a portion therefrom, said first slide being adapted to engage said second slide and translate the same relative to said mandrel.

9. In a banding machine for applying a band of flexible tubular material to a bottle neck or the like comprising: an elongated mandrel adapted to be received with a length of tubular material adjacent one end thereof, a first slide supported on said mandrel for longitudinal movement relative thereto, a second similarly supported slide, a gripping element external to said length cooperating with said first slide for gripping the sidewall of said length therebetween, means for translating said first slide and said gripping element in unison relative to said mandrel for feeding said length longitudinally of said mandrel, cutting means cooperating with said second slide for circumferentially cutting said length to sever a portion therefrom, said first slide being adapted to engage said second slide and translate the same relative to said mandrel, said gripping elements being in gripping engagement for holding said mandrel against deflection during the cutting operation.

10. In a banding machine for successively applying bands of flexible tubular material to the necks of bottles and the like arranged in a row in single file, a band applying head, means for moving said bottles in one direction at a uniform rate of speed past said head, a member rotatable about an axis perpendicular to said row for supporting said head for movement toward and away from said necks whereby said head has a horizontal component of movement in said direction, power means for rotating said member at a uniform angular velocity, and speed compensating means cooperating with said head for converting the varying horizontal component of the velocity of said head to a uniform velocity while said head is in working relationship with said necks.

11. In a banding machine for successively applying bands of flexible tubular material to the necks of bottles and the like arranged in a row in single file, a band applying head, means for moving said bottles in one direction at a uniform rate of speed past said head, a member rotatable about an axis perpendicular to said row for supporting said head for movement toward and away from said necks whereby said head has a horizontal component of movement in said direction, power means for rotating said member at a uniform angular velocity, and speed compensating means cooperating with said head for converting the varying horizontal component of the velocity of said head to a uniform velocity while said head is in working relationship with said necks, said speed compensating means including means for shifting said member horizontally during rotation thereof.

12. In a banding machine for successively applying bands of flexible tubular material to the necks of bottles and the like arranged in a row in single file, a band applying head, means for moving said bottles in one direction at a uniform rate of speed past said head, a member rotatable about an axis perpendicular to said row for supporting said head for movement toward and away from said necks whereby said head has a horizontal component of movement in said direction, power means for rotating said member at a uniform angular velocity, a second head associated with said power means and including a rotatable shaft for so rotatably supporting said member, cam means in said second head actuated by said power means for horizontally shifting said shaft during rotation thereof.

13. In a banding machine for successively applying bands of flexible tubular material to the necks of bottles and the like arranged in a row in single file, a band applying head, means for moving said bottles in one direction at a uniform rate of speed past said head, a pair of cranks rotatably supported at one of their corresponding ends and connected at their opposite corresponding ends to said head for moving said head in a generally circular path of travel with said head moving in said direction when the same is adjacent said necks, speed compensating means supporting said cranks and adapted to shift the latter horizontally during rotation thereof whereby the horizontal component of the velocity of said head is uniform during a portion of the rotation of said cranks.

14. In a banding machine for successively applying bands of flexible tubular material to the necks of bottles and the like arranged in a row in single file, a band applying head, means for moving said bottles in one direction at a uniform rate of speed past said head, a pair of cranks rotatably supported at one of their corresponding ends and connected at their opposite corresponding ends to said head for moving said head in a generally circular path of travel with said head moving in said direction when the same is adjacent said necks, speed compensating means supporting said cranks and adapted to shift the latter horizontally during rotation thereof whereby the horizontal component of the velocity of said head is uniform during a portion of the rotation of said cranks, said speed compensating means including a pair of gears operatively connected with said cranks for driving the latter at a uniform angular velocity and a third gear connected with a power shaft for rotating said pair of gears, a cam on said power shaft and a fixed follower cooperating with said cam for urging said shaft and said three gears horizontally as a unit, said cam being formed to drive said shaft in a horizontal direction at a rate whereby the resultant speed of said head is uniform in a horizontal direction.

15. Means for longitudinally feeding an elongated tubular member comprising: a mandrel adapted to be received within said member, an inner gripping element carried by said mandrel and supported for movement longitudinally of said member, an outer gripping element, means supporting said outer gripping element for movement longitudinally of said mandrel, means for relatively moving said inner and outer elements toward each other for gripping the adjacent wall of said member therebetween, and means for relatively moving said mandrel and said elements longitudinally of said member while said wall is so gripped, said means for relatively moving said inner and outer elements toward each other comprising an electromagnetic element adapted to apply a magnetic field around said elements for urging the same together.

16. In a band applying device for applying a band of flexible tubular material around a bottle neck or the like comprising: a head, means supporting said head for movement toward and away from said neck, an elongated mandrel adapted to be received within an elongated length of tubular material adjacent one end thereof, means mounting said mandrel in said head for movement relative to said head and toward and away from said neck, said mandrel being provided with a base adapted to abut the closure of said bottle neck when said mandrel is moving toward said neck and in alignment therewith, means carried by said head for gripping the sidewall of said length for holding said length fixed relative to said head as the latter is moving relative to said mandrel for feeding said band toward said neck, cutting means carried by said head and cooperating with said mandrel for severing a portion of said length adjacent said end to provide a band.

17. In a band applying device for applying a band of flexible tubular material around a bottle neck or the like comprising: a head, means supporting said head for movement toward and away from said neck, an elongated mandrel adapted to be received within an elongated length of tubular material adjacent one end thereof, means mounting said mandrel in said head for movement relative to said head and toward and away from said neck, said mandrel being provided with a base adapted to abut the closure of said bottle neck when said mandrel is moving toward said neck and in alignment therewith, means carried by said head for gripping the sidewall of said length for holding said length fixed relative to said head as the latter is moving relative to said mandrel for feeding said band toward said neck, cutting means carried by said head and cooperating with said mandrel for severing a portion of said length adjacent said end to provide a band, said cutting means being adapted to sever said portion while said mandrel is out of engagement with said closure.

18. In a band applying device for applying a band of flexible tubular material around a bottle neck or the like comprising: a head, means supporting said head for movement toward and away from said neck, an elongated mandrel adapted to be received within an elongated length of tubular material adjacent one end thereof, means mounting said mandrel in said head for movement relative to said head and toward and away from said neck, said mandrel being provided with a base adapted to abut the closure of said bottle neck when said mandrel is moving toward said neck and in alignment therewith, means carried by said head for gripping the sidewall of said length for holding said length fixed relative to said head as the latter is moving relative to said mandrel for feeding said band toward said neck, cutting means carried by said head and cooperating with said mandrel for severing a portion of said length adjacent said end to provide a band, said cutting means comprising a plate carried by said head and provided with an aperture through which said mandrel extends, said aperture being provided with a radially inwardly directed cutting edge in surrounding relationship to said mandrel, means carried by said head for imparting an orbital movement to said plate whereby said cutting edge progressively engages the periphery of said length for severing the same.

No references cited.